(12) United States Patent  
Diankov et al.

(10) Patent No.: US 10,335,947 B1
(45) Date of Patent: Jul. 2, 2019

(54) ROBOTIC SYSTEM WITH PIECE-LOSS MANAGEMENT MECHANISM

(71) Applicant: Mujin, Inc., Tokyo (JP)

(72) Inventors: Rosen Diankov, Tokyo (JP); Huan Liu, Tokyo (JP); Denys Kanunikov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

(21) Appl. No.: 16/252,383

(22) Filed: Jan. 18, 2019

(51) Int. Cl.
*B25J 9/16* (2006.01)
*B65G 61/00* (2006.01)

(52) U.S. Cl.
CPC .......... *B25J 9/1664* (2013.01); *B25J 9/1633* (2013.01); *B25J 9/1674* (2013.01); *B65G 61/00* (2013.01)

(58) Field of Classification Search
CPC ............................ B25J 9/1633; B25J 9/1664
See application file for complete search history.

(56) References Cited

U.S. PATENT DOCUMENTS

| | | | |
|---|---|---|---|
| 9,205,558 B1* | 12/2015 | Zevenbergen | B25J 9/1664 |
| 9,238,304 B1* | 1/2016 | Bradski | B25J 9/163 |
| 9,333,649 B1* | 5/2016 | Bradski | B25J 9/163 |
| 9,393,693 B1* | 7/2016 | Kalakrishnan | B25J 9/1671 |
| 2012/0253507 A1* | 10/2012 | Eldershaw | B65G 47/00 700/218 |
| 2013/0184868 A1* | 7/2013 | Inazumi | B25J 9/1633 700/258 |
| 2016/0059412 A1* | 3/2016 | Oleynik | B25J 9/163 700/257 |
| 2016/0075031 A1* | 3/2016 | Gotou | B25J 9/1697 700/259 |
| 2017/0106534 A1* | 4/2017 | Nakamoto | B25J 9/1075 |
| 2017/0173795 A1* | 6/2017 | Tan | B25J 9/1666 |
| 2018/0361586 A1* | 12/2018 | Tan | B25J 9/16 |
| 2018/0361595 A1* | 12/2018 | Troy | B25J 13/088 |
| 2019/0001508 A1* | 1/2019 | Li | B25J 9/1612 |

* cited by examiner

Primary Examiner — Thomas Randazzo
(74) Attorney, Agent, or Firm — Perkins Coie LLP (57) ABSTRACT

A method for operating a robotic system that includes calculating a base motion plan, wherein the base motion plan includes a sequence of commands or settings, or a combination thereof, that operates a robotic arm and a gripper to transfer a target object from a start location to a task location; receiving a contact measure while executing the base motion plan, wherein the contact measure represents an amount of grip of the gripper on the target object; and generating one or more actuator commands/settings that deviate from the base motion plan when the contact measure fails to satisfy a threshold, wherein the one or more actuator commands/settings thereof are configured to operate the robotic arm, the gripper, or a combination thereof to execute one or more response actions not included in the base motion plan.

20 Claims, 5 Drawing Sheets

ROBOTIC SYSTEM WITH PIECE-LOSS MANAGEMENT MECHANISM

TECHNICAL FIELD

The present technology is directed generally to robotic systems and, more specifically, to systems, processes, and techniques for detecting and managing piece-loss scenarios.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

However, despite the technological advancements, robots often lack the sophistication necessary to duplicate human sensitivity and/or adaptability required for executing more complex tasks. For example, robot end-effectors (e.g., robotic hands or grippers) often have difficulty grabbing objects with relatively soft and/or irregular surfaces due to lack of sensitivity in contact sensors and/or insufficient granularity in force control. Also, for example, robots often cannot account for conditions or situations outside of the targeted conditions/scenario due to lack of adaptability. Accordingly, there remains a need for improved techniques and systems for controlling and managing various aspects of the robots.

DETAILED DESCRIPTION

Systems and methods for a robotic system with a piece-loss management mechanism are described herein. The robotic system (e.g., an integrated system of devices that execute one or more designated tasks) configured in accordance with some embodiments provides piece-loss management by implementing granular control/manipulation of a target object according to a contact measure. Using one or more sensors, the robotic system can determine the contact measure that represents a quantized amount of contact corresponding to a stability of the target object relative to an end-effector. In other words, the contact measure can represent a quantized amount of grip that the end-effector has on the target object. Based on the contact measure, the robotic system can regrip the target object, execute a controlled drop of the target object at a designated location, select and/or adjust a motion plan, or a combination thereof.

The robotic system can be configured to execute a task based on manipulating (e.g., physically displacing and/or reorienting) the target object. For example, the robotic system can sort or relocate various objects based on picking the target object from a source location (e.g., a bin, a pallet, or a conveyer belt) and moving it to a destination location. In some embodiments, for manipulating the target object, the robotic system can include a gripper operably connected to a robot arm. The gripper can be configured to affix the target object relative to the robot arm. In other words, the robotic system can operate the gripper (via, e.g., one or more associated motors/actuators and sensors) to grab the target object and hold it relative to the robot arm. The robotic system can similarly operate the robot arm to manipulate the gripper, the target object held by the gripper, or a combination thereof.

To execute the task, in some embodiments, the robotic system can include an imaging device (e.g., a camera, an infrared sensor/camera, a radar, a lidar, etc.) used to identify a location and/or a pose (e.g., a resting orientation) of the target object and/or the environment around the target object. According to the location, the pose, or a combination thereof, the robotic system can implement a motion plan (e.g., a sequence of controls for the actuators for moving one or more links and/or joints) to execute the task. For example, for sorting and/or relocating the target object, the motion plan can correspond to gripping the target object initially at the source location, manipulating it across space, and placing it at the destination location.

In some situations, however, the grip (e.g., a degree of attachment) of the gripper on the target object can fail during execution of the task. As a result, the target object may be displaced or shifted relative to the gripper. In some cases, grip failure can lead to a lost piece (e.g., the target object that was not placed at the destination location and/or in an intended pose), such as when the gripper drops or loses control of the target object during the manipulation. Failed grip can be caused by, for example, forces applied to the target object and/or inertia of the target object, shifting of the target object (e.g., a box or content inside the box), or a combination thereof resulting from the manipulation. Also, for example, failed grip can be caused by a calibration error in the imaging mechanism.

Traditional manipulators (e.g., picker robots) often implement a relatively fixed motion plan that does not deviate from the task. While traditional manipulators may account for different locations and/or poses of an object, once the object is picked up, the motion plan to manipulate the object to a destination location/orientation remains fixed. In contrast, various embodiments of the robotic system described below are configured to determine (e.g., when the target object is gripped and/or while executing the task) a contact measure (e.g., an amount or a degree of the grip) and implement granular control/manipulation of the target object accordingly. Determination of the contact measure and the granular control/manipulation are described in detail below.

In the following, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Suitable Environments

Figure 1:
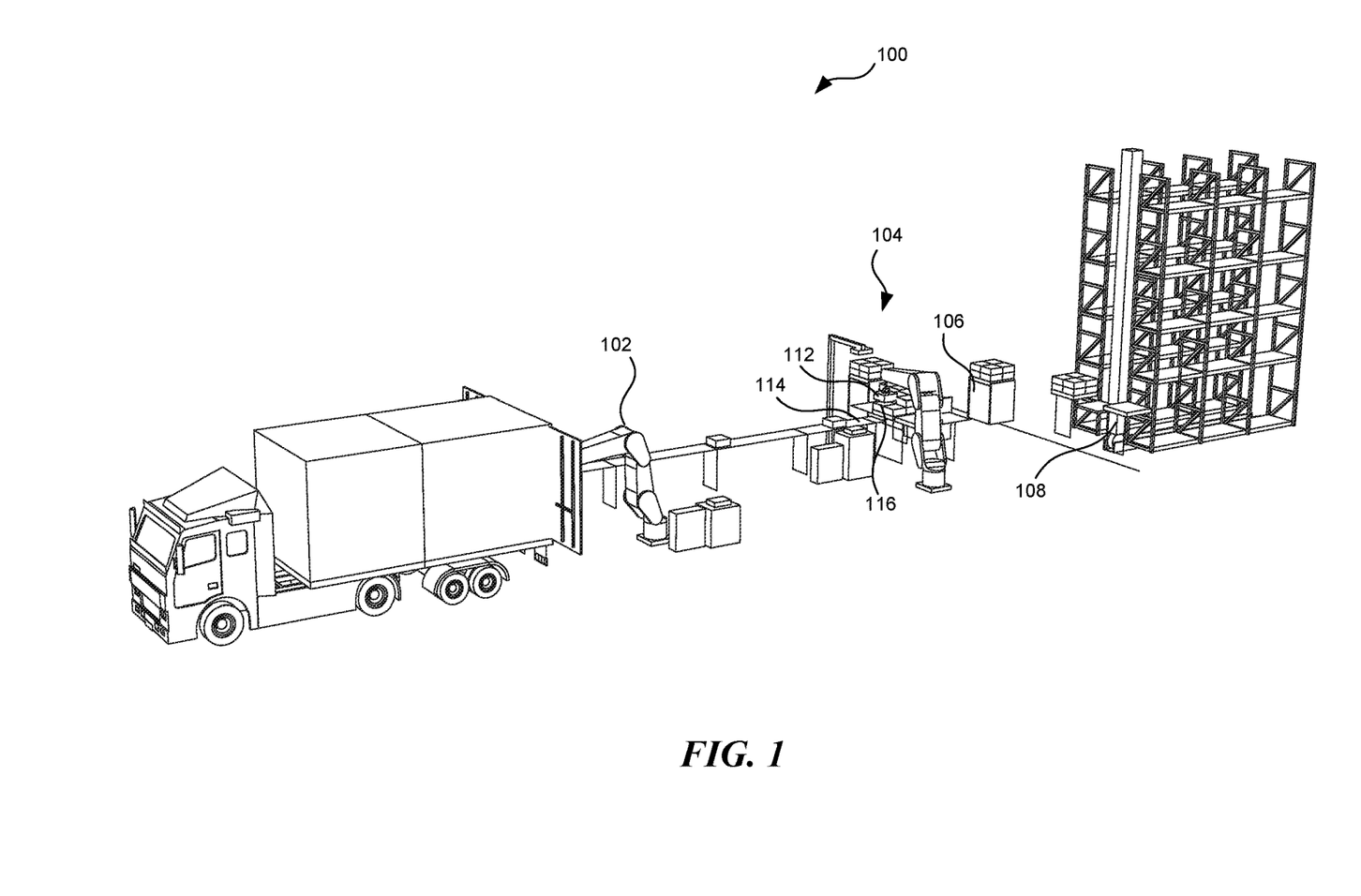
FIG. 1 is an illustration of an example environment in which a robotic system with a piece-loss management mechanism may operate.

FIG. 1 is an illustration of an example environment in which a robotic system 100 with a piece-loss management mechanism may operate. The robotic system 100 includes one or more structures (e.g., robots) configured to execute one or more tasks. Aspects of the piece-loss management mechanism can be practiced or implemented by the various structures.

For the example illustrated in FIG. 1, the robotic system 100 can include an unloading unit 102, a transfer unit 104, a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van for storage in a warehouse or to unload objects from storage locations and load them onto a truck or a van for shipping. For another example, the task can include moving objects from one container to another container. Each of the units can be configured to execute a sequence of actions (e.g., operating one or more components therein) to execute a task.

In some embodiments, the task can include manipulation (e.g., moving and/or reorienting) of a target object 112 (e.g., boxes, cases, cages, pallets, etc.) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 (e.g., a palletizing robot) can be configured to transfer the target object 112 from a location on the conveyor belt to a location on the transport unit 106, such as for loading the target object 112 on a pallet on the transport unit 106. For another example, the transfer unit 104 (e.g., a piece-picking robot) can be configured to transfer the target object 112 from one container to another container. In completing the operation, the transport unit 106 can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

Suitable System

Figure 2:
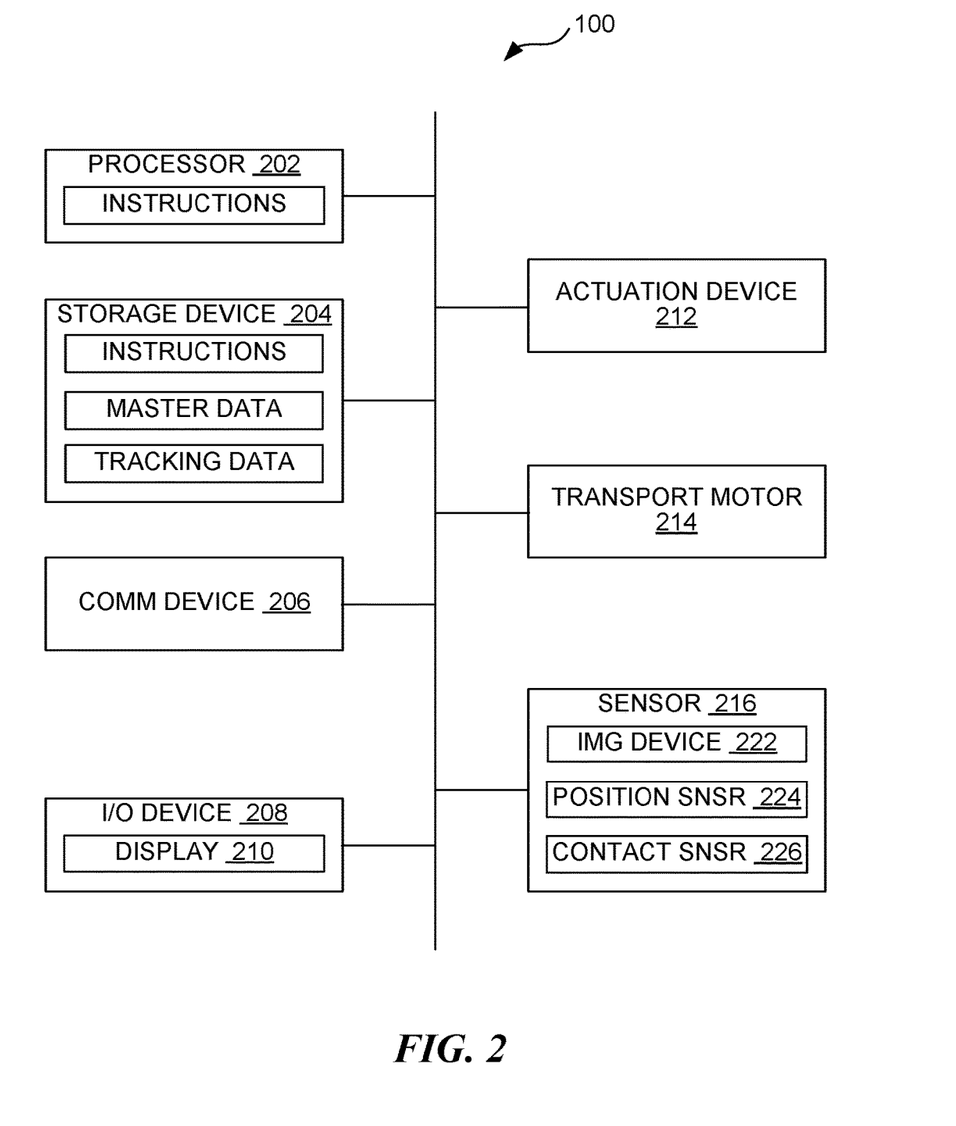
FIG. 2 is a block diagram illustrating the robotic system in accordance with one or more embodiments of the present technology.

FIG. 2 is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, controllers, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g. software instructions) stored on the storage devices 204 (e.g., computer memory). The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to processing results and/or predetermined data/thresholds. For example, the storage devices 204 can store master data that includes descriptions of objects (e.g., boxes, cases, and/or products) that may be manipulated by the robotic system 100. In one or more embodiments, the master data can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, or a combination thereof for the objects expected to be manipulated by the robotic system 100. In some embodiments, the master data can include manipulation-related information regarding the objects, such as a center-of-mass location on each of the objects, expected sensor measurements (e.g., for force, torque, pressure, and/or contact measurements) corresponding to one or more actions/maneuvers, or a combination thereof. Also, for example, the storage devices 204 can store object tracking data. In some embodiments, the object tracking data can include a log of scanned or manipulated objects. In some embodiments, the object tracking data can include imaging data (e.g., a picture, point cloud, live video feed, etc.) of the objects at one or more locations (e.g., designated pickup or drop locations and/or conveyor belts). In some embodiments, the object tracking data can include locations and/or orientations of the objects at the one or more locations.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or for a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., 2-dimensional and/or 3-dimensional cameras including visual and/or infrared cameras, lidars, radars, and/or other distance-measuring or imaging devices) configured to detect the surrounding environment. The imaging device 214 can generate a representation of the detected environment, such as a digital image and/or a point cloud, used for implementing machine/computer vision (e.g., for automatic inspection, robot guidance, or other robotic applications). As described in further detail below, the robotic system 100 (via, e.g., the processors 202) can process the digital image and/or the point cloud to identify the target object 112 of FIG. 1, the start location 114 of FIG. 1, the task location 116 of FIG. 1, a pose of the target object 112 of FIG. 1, or a combination thereof. For manipulating the target object 112, the robotic system 100 (e.g., via the various units) can capture and analyze an image of a designated area (e.g., inside the truck, inside the container, or a pickup location for objects on the conveyor belt) to identify the target object 112 and the start location 114 thereof. Similarly, the robotic system 100 can capture and analyze an image of another designated area (e.g., a drop location for placing objects on the conveyor belt, a location for placing objects inside the container, or a location on the pallet for stacking purposes) to identify the task location 116.

Also, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task.

In some embodiments, the sensors 216 can include contact sensors 226 (e.g., pressure sensors, force sensors, strain gauges, piezoresistive/piezoelectric sensors, capacitive sensors, elastoresistive sensors, and/or other tactile sensors) configured to measure a characteristic associated with a direct contact between multiple physical structures or surfaces. The contact sensors 226 can measure the characteristic that corresponds to a grip of the end-effector (e.g., the gripper) on the target object 112. Accordingly, the contact sensors 226 can output a contact measure that represents a quantified measure (e.g., a measured force, torque, position, etc.) corresponding to a degree of contact or attachment between the gripper and the target object 112. For example, the contact measure can include one or more force or torque readings associated with forces applied to the target object 112 by the end-effector. Details regarding the contact measure are described below.

As described in further detail below, the robotic system 100 (via, e.g., the processors 202) can implement different actions to accomplish the task based on the contact measure. For example, the robotic system 100 can regrip the target object 112 if the initial contact measure is below a threshold. Also, the robotic system 100 can intentionally drop the target object 112, adjust the task location 116, adjust a speed or an acceleration for the action, or a combination thereof if the contact measure falls below a threshold during execution of the task.

Contact Measurements

Figure 3A:
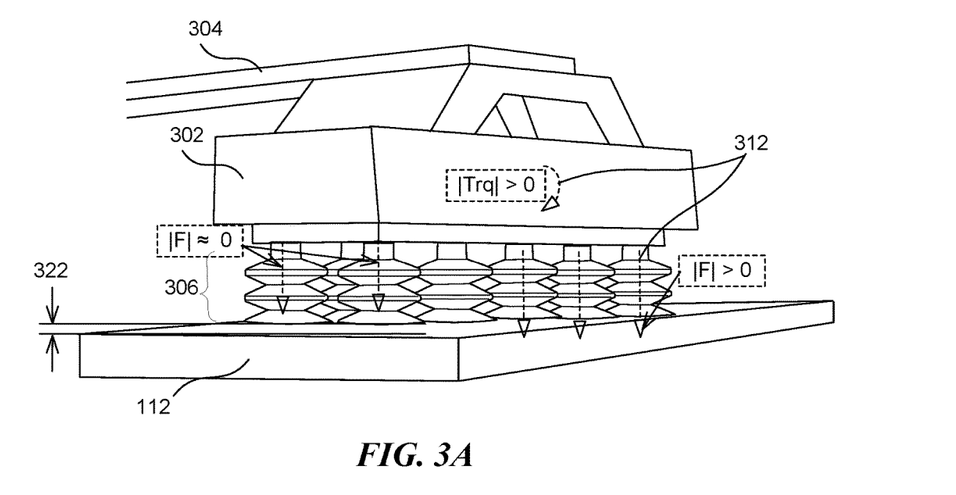
FIG. 3A is an illustration of an example of a grip state in accordance with one or more embodiments of the present technology.
Figure 3B:
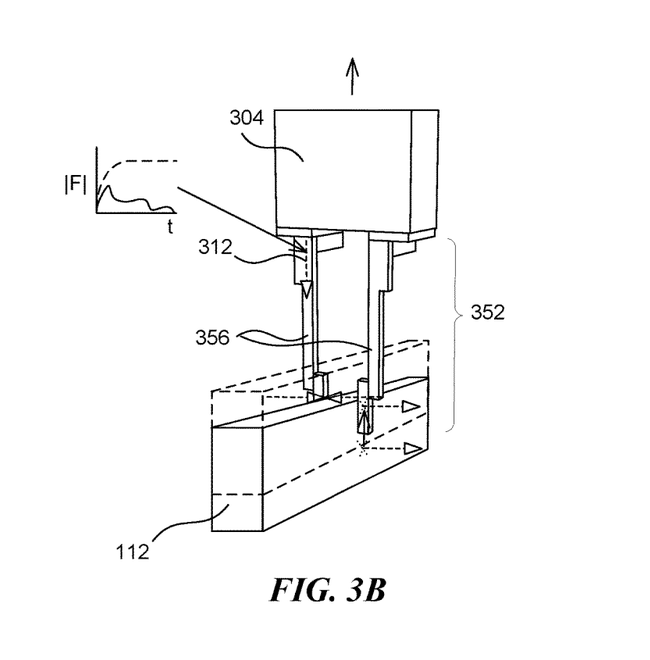
FIG. 3B is an illustration of a further example of a grip state in accordance with one or more embodiments of the present technology.

FIG. 3A and FIG. 3B illustrate examples of grip states in accordance with one or more embodiments of the present technology. In some embodiments, the robotic system 100 of FIG. 1 (e.g., at one or more units, such as the palletizing/depalletizing robot, the picker robot, etc. described above) can include an end-effector (e.g., a gripper) connected to a robotic arm 304. The robotic arm 304 can include structural members and/or joints between the members configured to manipulate the end-effector. The end-effector can be manipulated by operating the actuation devices 212 of FIG. 2 connected to the structural members and/or the joints of the robotic arm 304.

In some embodiments, the end-effector (e.g., the gripper) can be configured to grip an object, thereby securing it or affixing it relative to the end-effector. The end-effector can also be operated (e.g., for grabbing and/or releasing) by operating one or more of the actuation devices 212 associated with or attached to one or more portions of the end-effector.

In one or more embodiments, as illustrated in FIG. 3A, the end-effector can include a gripper 302 (e.g., an astrictive or a suction gripper) configured to hold or affix the target object 112 via attractive forces, such as achieved by forming and maintaining a vacuum condition between the gripper 302 and the target object 112. For example, the gripper 302 can include a set of suction cups 306 configured to contact a surface of the target object 112 and form/retain the vacuum condition in the spaces between the suction cups 306 and the surface. The vacuum condition can be created when the gripper 302 is lowered via the robotic arm 304, thereby pressing the suction cups 306 against the surface of the target object 112 and pushing out gases between the opposing surfaces. When the robotic arm 304 lifts the gripper 302, a difference in pressure between the spaces inside the suction cups 306 and the surrounding environment can keep the target object 112 attached to the suction cups 306. Accordingly, a degree of grip or attachment of the gripper 302 on the target object 112 can be based on the number of the suction cups 306 successfully creating and holding the vacuum condition.

Various factors may prevent the suction cups 306 from successfully creating and holding the vacuum condition. For example, a calibration error in the imaging devices 222 of FIG. 2 can cause the gripper 302 to be misplaced or misaligned relative to the target object 112. As such, one or more of the suction cups 306 may not properly contact (e.g., as illustrated by a separation gap 322) the surface of the target object 112 to create and hold the vacuum condition. Also, unexpected deformities or particulates on the surface of the target object 112 may prevent one or more of the suction cups 306 from forming a sealed space on the surface of the target object 112 that holds the vacuum condition. Also, during manipulation of the target object 112, one or more of the suction cups 306 may experience forces resulting from movement inertia and/or shifting (e.g., a box or content inside the box) of the target object 112. When the experienced forces are greater than the integrity of the formed seal, the suction cups 306 may fail to hold the vacuum condition.

In some embodiments, the gripper 302 includes the contact sensors 226 of FIG. 2 (e.g., one or more force, pressure, torque, and/or other tactile sensors) configured to determine a contact measure 312. The contact sensors 226 can generate the contact measure 312 as a representation of a degree of attachment of the gripper 302 to the target object 112. In other words, the contact measure 312 can represent a measure or an amount of grip of the end-effector on the target object 112. For example, the contact sensors 226 can include touch or tactile sensors configured to indicate whether sensed surfaces are contacting another surface and/or configured to determine the size of the surface area contacting another surface. Also, the contact sensors 226 can include pressure sensors configured to measure the pressure (e.g., the vacuum condition) inside the suction cups 306. Also, the contact sensors 226 can include linear force sensors configured to measure the weight (e.g., as illustrated by dashed linear arrows) of the target object 112 borne or supported by the suction cups 306. Further, the contact sensors 226 can include torque sensors configured to measure torque (e.g., as illustrated by dashed curved arrows) on the suction cups 306, the gripper 302, and/or the robotic arm 304. In comparison to a fully gripped state, the torque measurements can change (e.g., increase) when some of the suction cups 306 (e.g., the peripherally located ones) fail to hold the vacuum condition. According to the type and/or location of the contact sensors 226, the contact measure 312 can correspond to a sum or an average of the measurements (e.g., the internal pressure, the linear force, and/or the torque) across the suction cups 306, a quantity of the suction cups 306 and/or locations thereof with measurements satisfying a vacuum threshold, or a combination thereof.

As an illustrative example, FIG. 3A shows suction cups on a distal end (i.e., located on the right side of FIG. 3A) of the gripper 302 having grip on the target object 112 (as illustrated by arrows traversing through to the target object 112). In contrast, suction cups on a proximal end (i.e., located on the left side of FIG. 3A) of the gripper 302 are shown as being separated by the separation gap 322. Accordingly, linear force sensors corresponding to the suction cups on the distal end can determine non-zero readings associated with the weight borne by the distal suction cups. Also, linear force sensors corresponding to the suction cups on the proximal end can determine zero or near-zero readings due to the failed grip. Further, due to the uneven distribution of the force, a torque sensor associated with the gripper 302 can determine a non-zero reading.

In comparison, if all of the suction cups 306 established and maintained the vacuum condition with the surface of the target object 112, the linear force readings would have a non-zero magnitude at all of the suction cups 306 and/or deviations between of the linear force readings would be within a relatively small range. Further, since the weight would be distributed in a substantially even manner across the suction cups 306, the torque measured at the gripper 302 would be closer to a zero value.

As such, the robotic system 100 can use the above examples of the contact measure 312 as a representation of grip of the gripper 302 on the target object 112. For example, the deviations in the linear force readings and/or torque readings can inversely represent the grip strength. In other words, greater deviations from expected readings (e.g., near-zero deviations in the linear force measurements and/or near-zero torque measurements can correspond to a strong grip) can correspond to weaker grip. In some embodiments, the robotic system 100 can further use a lookup/translation table, an equation, a process, or a combination thereof for translating/transposing the expected readings according to different orientations (e.g., poses) of the gripper 302 and the target object 112. In some embodiments, the master data can include the expected readings for each of the different orientations of the gripper 302 and the target object 112. The robotic system 100 can use the expected readings to evaluate or process the contact measure 312 according to the orientation of the gripper 302 and the target object 112.

In some embodiments, as illustrated in FIG. 3B, the robotic system 100 of FIG. 1 (e.g., at one or more units, such as the palletizing/depalletizing robot, the picker robot, etc. described above) can include a gripper 352 (e.g., an impactive gripper) configured to physically grasp the target object 112 via direct impact. For example, the gripper 352 can include gripper jaws 356 configured to grip the target object 112 based on applying opposing or compressing forces on the target object 112. The target object 112 can be gripped based on the resulting friction between contacting surfaces of the gripper jaws 356 and the target object 112.

Various factors may prevent the gripper jaws 356 from successfully gripping the target object 112. For example, a calibration error in the imaging devices 222 of FIG. 2 can cause the gripper 352 to be misplaced or misaligned relative to the target object 112. As such, the gripper jaws 356 may contact unintended portions of the target object 112, such as where the surface characteristics reduce the resulting friction. Also, unexpected deformities or particulates on the surface of the target object 112 may reduce the resulting friction. Also, during manipulation of the target object 112, the gripper jaws 356 may experience forces resulting from movement inertia and/or shifting (e.g., a box or content inside the box) of the target object 112. When the experienced forces are greater than the friction force, the gripper jaws 356 may fail to hold the vacuum condition.

In some embodiments, the gripper 352 includes the contact sensors 226 of FIG. 2 (e.g., one or more force, pressure, and/or torque sensors) configured to determine the contact measure 312. For example, the contact sensors 226 can include tactile sensors that indicate direct contact between sensed surfaces and other surfaces and/or measure the size of the contact area. Also, the contact sensors 226 can include pressure or tactile sensors on a contacting surface of the gripper jaws 356 configured to measure a force exerted on the target object 112 by the gripper jaws 356. Further, the contact sensors 226 can include linear force sensors configured to measure the weight of the target object 112. When the grip fails, the target object 112 can slip, which can result in a reduction in the weight sensed by the linear force sensors.

As illustrated in FIG. 3B, for example, improper or failed grip can result in the target object 112 remaining stationary (i.e., sliding down relative to the gripper jaws 356) as the gripper 352 moves upward in an attempt to lift the target object 112. Accordingly, the weight or the force measured by the linear force sensor can be less than the actual weight or a portion thereof (e.g., about half on each jaw) that would have been measured if the grip were sufficient and the target object 112 had remained fixed relative to the gripper jaws 356. As an illustrative example, the robotic system 100 can track measurements of a linear force sensor associated with the gripper 352, the robotic arm 304, and/or the gripper jaws 356 during an initial lift action following the gripping action. An expected measurement profile (illustrated using dashed lines in the force magnitude v. time plot in FIG. 3B) can correspond to the measured downward force rising to match the weight of the target object 112 within a predetermined duration. However, sensor readings for an improper grip can correspond to the measured downward force failing to rise to the expected levels and reaching zero or near-zero magnitude by the end of the initial lift maneuver. In some situations, momentary loss in the grip (i.e., representative of an overall weak grip condition) can correspond to a negative spike or a momentary drop in the sensed linear force.

In some embodiments, the contact sensors 226 can include torque sensors configured to measure torque on the gripper jaws 356, such as when the gripper is oriented horizontally. An improper grip can cause the target object 112 to shift (e.g., away) from the gripper jaws 356 during a lifting action, thereby changing the location of center of gravity of the target object 112 relative to the gripper 352. Accordingly, the amount and/or the direction of torque applied to the gripper jaws 356 can change based on the shifted center of gravity. The contact measure 312 can correspond to the above-described measurements according to the type and/or location of the contact sensors 226.

System Operation

Figure 4:
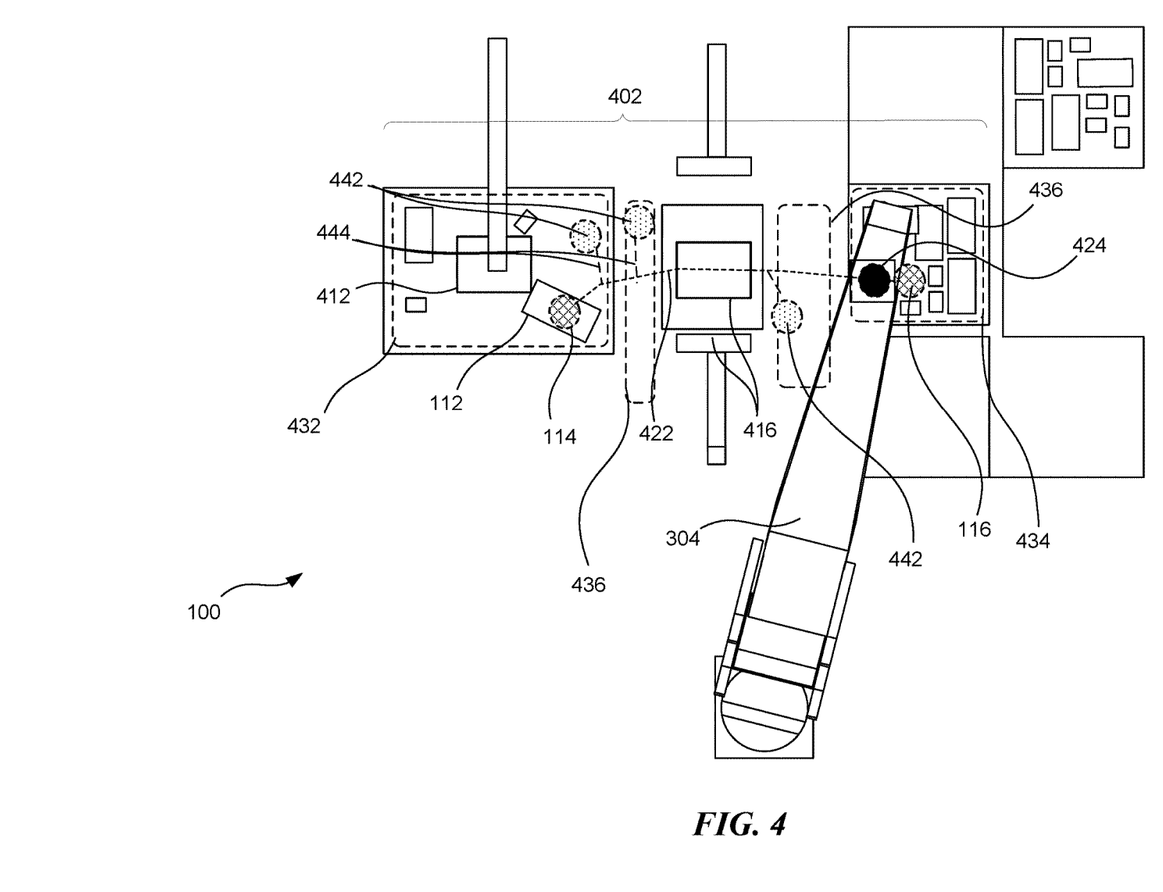
FIG. 4 is a top view illustrating an example task executed by the robotic system in accordance with one or more embodiments of the present technology.

FIG. 4 is a top view illustrating an example task 402 executed by the robotic system 100 in accordance with one or more embodiments of the present technology. As described above, the task 402 can represent a sequence of actions executed by the robotic system 100 (e.g., by one of the units described above, such as the transfer unit 104 of FIG. 1) to achieve a goal. As illustrated in FIG. 4, for example, the task 402 can include moving the target object 112 from the start location 114 (e.g., a location on/in a receiving pallet or bin) to the task location 116 (e.g., a location on/in a sorted pallet or bin).

In some embodiments, the robotic system 100 can image a predetermined area to identify and/or locate the start location 114. For example, the robotic system 100 can include a source scanner 412 (i.e., an instance of the imaging devices 222 of FIG. 2) directed at a pickup area, such as an area designated for a sourcing pallet or bin and/or a region on a receiving side of the conveyor belt. The robotic system 100 can use the source scanner 412 to generate imaging data (e.g., a captured image and/or a point cloud) of the designated area. The robotic system 100 (via, e.g., the processors 202 of FIG. 2) can implement computer vision processes for the imaging result to identify the different objects (e.g., boxes or cases) located in the designated area. Details of the object identification are described below.

From the recognized objects, the robotic system 100 can select (e.g., according to a predetermined sequence or set of rules and/or templates of object outlines) one as the target object 112 for an execution of the task 402. For the selected target object 112, the robotic system 100 can further process the imaging result to determine the start location 114 and/or an initial pose. Details of the selection and the location/pose determination are described below.

The robotic system 100 can further image and process another predetermined area to identify the task location 116. In some embodiments, for example, the robotic system 100 can include another instance of the imaging devices 222 (not shown) configured to generate an imaging result of a placement area, such as an area designated for a sorted pallet or bin and/or a region on a sending side of the conveyor belt. The imaging result can be processed (via, e.g., the processors 202) to identify the task location 116 and/or a corresponding pose for placing the target object 112. In some embodiments, the robotic system 100 can identify (based on or without the imaging result) the task location 116 according to a predetermined sequence or set of rules for stacking and/or arranging multiple objects.

Using the identified start location 114 and/or the task location 116, the robotic system 100 can operate one or more structures (e.g., the robotic arm 304 and/or the end-effector, such as the gripper 302 of FIG. 3A and/or the gripper 352 of FIG. 3B) of a corresponding unit (e.g., the transfer unit 104) to execute the task 402. Accordingly, the robotic system 100 (via, e.g., the processors 202) can calculate (via, e.g., motion planning rules or algorithms) a base motion plan 422 that corresponds to one or more actions that will be implemented by the corresponding unit to execute the task 402. For example, the base motion plan 422 for the transfer unit 104 can include positioning the end-effector for pickup, gripping the target object 112, lifting the target object 112, transferring the target object 112 from above the start location 114 to above the task location 116, lowering the target object 112, and releasing the target object 112. Also, the base motion plan 422 can include only the actions necessary to successfully complete the task 402, such as for ideal conditions (e.g., without any interruptions, errors, unexpected external influences, etc.) or executions.

In some embodiments, the robotic system 100 can calculate the base motion plan 422 by determining a sequence of commands and/or settings for one or more of the actuation devices 212 of FIG. 2 that operate the robotic arm 304 and/or the end-effector. For example, the robotic system 100 can use the processors 202 to calculate the commands and/or settings of the actuation devices 212 for manipulating the end-effector and the robotic arm 304 to place the gripper at a particular location about the start location 114, engage and grab the target object 112 with the end-effector, place the end-effector at a particular location about the task location 116, and release the target object 112 from the end-effector. The robotic system 100 can execute the actions for completing the task 402 by operating the actuation devices 212 according to the determined sequence of commands and/or settings.

In some embodiments, the task 402 can include scanning (e.g., scanning a barcode or a QR code) the target object 112, such as for product logging purposes and/or for further identifying the target object 112. For example, the robotic system 100 can include an object scanner 416 (e.g., a further instance of the imaging devices 222, such as a barcode scanner or a QR code scanner) configured to scan the target object 112, typically at a location between the pickup area and the placement area. Accordingly, the robotic system 100 can calculate the base motion plan 422 to place the target object 112 at a scanning location with a predetermined pose such that a portion or a surface of the target object 112 is presented to the object scanner 416.

In executing the actions for the task 402, the robotic system 100 can track a current location 424 (e.g., a set of coordinates corresponding to a grid used by the robotic system 100) of the target object 112. For example, the robotic system 100 (via, e.g., the processors 202) can track the current location 424 according to data from the position sensors 224 of FIG. 2. The robotic system 100 can locate one or more portions of the robotic arm 304 (e.g., the structural members and/or the joints thereof) in the kinetic chain according to the data from the position sensors 224. The robotic system 100 can further calculate the location and orientation of the end-effector, and thereby the current location 424 of the target object 112 held by the end-effector, based on the location and orientation of the robotic arm 304. Also, the robotic system 100 can track the current location 424 based on processing other sensor readings (e.g., force readings or accelerometer readings), the executed actuation commands/settings and/or associated timings, or a combination thereof according to a dead-reckoning mechanism.

Also, in executing the actions for the task 402, the robotic system 100 (via, e.g., the contact sensors 226) can determine the contact measure 312 of FIG. 3A/FIG. 3B. The robotic system 100 can determine or sample the contact measure 312 at various times, such as after executing a portion of the base motion plan 422 (e.g., a gripping action, a displacing action, and/or a rotating action), according to a predetermined sampling interval or timing, or a combination thereof.

Based on the contact measure 312, the robotic system 100 can execute different actions to complete the task 402. In other words, the robotic system 100 can implement granular control/manipulation of the target object 112 according to the contact measure 312. For example, when or while the contact measure 312 satisfies a first threshold, the robotic system 100 can implement the base motion plan 422. When the contact measure 312 fails to satisfy (e.g., falls below) the first threshold, the robotic system 100 can deviate from the base motion plan 422 and execute one or more additional and/or different actions. For example, when the contact measure 312 is below a gripping threshold after implementing the gripping action (e.g., by pressing the suction cups 306 of FIG. 3A into the target object 112 or by applying the compressing forces via the gripper jaws 356 of FIG. 3B on opposing sides of the target object 112), the robotic system 100 can re-execute the gripping action after releasing the target object 112 and/or adjusting the position of the end-effector. The robotic system 100 can subsequently determine the contact measure 312 and repeat the regripping process up to a predetermined limit if the contact measure 312 remains below the gripping threshold. If the regripping attempt results in the contact measure 312 that satisfies the gripping threshold, the robotic system 100 can continue with the remaining portions of the base motion plan 422. In some embodiments, if the robotic system 100 fails to sufficiently grip the target object 112 after a limited number of attempts, the robotic system 100 can drop and leave the target object 112 and execute the task on a different object (e.g., identifying a different object as the target object 112 for the next task).

Also, the robotic system 100 can deviate from the base motion plan 422 when the contact measure 312 falls below a transit threshold during manipulation of the target object 112 (e.g., after executing the gripping action). In some embodiments, the robotic system 100 can execute a subsequent action (e.g., a controlled drop) based on the current location 424. For example, the robotic system 100 can intentionally lower and/or release the target object 112 when the current location 424 of the target object 112 is above/within one or more predetermined areas.

In some embodiments, the predetermined areas designated for the controlled drop action can include a source drop area 432, a destination drop area 434, and/or one or more transit drop areas 436. The source drop area 432 can correspond to (e.g., overlap with or be offset inward by a predetermined distance from) an area enclosed by the boundaries of the pickup area, such as the edges of the pallet or walls of the bin/cage. Similarly, the destination drop area 434 can correspond to the boundaries of the placement area. The transit drop areas 436 can include areas between the pickup area and the placement area where the robotic system 100 can drop or place the target object 112 such that the object will not interfere with execution of the subsequent tasks. For the example illustrated in FIG. 4, the transit drop areas 436 can be before and/or after (i.e., in moving from the pickup area to the placement area) the object scanner 416.

Accordingly, when the contact measure 312 fails to satisfy a threshold, the robotic system 100 can calculate an adjusted drop location 442 in one of the drop areas for placing the target object 112. The robotic system 100 can identify the adjusted drop location 442 as a location between the current location 424 and the task location 116 that has sufficient space for placing the target object 112. The robotic system 100 can identify the adjusted drop location 442 similarly as the task location 116. Based on the identified adjusted drop location 442 and the current location 424, the robotic system can calculate an adjusted motion plan 444 for moving the target object 112 and placing it at the adjusted drop location 442. Details regarding the identification of the adjusted drop location 442 and the calculation of the adjusted motion plan 444 are described below.

Operational Flow

Figure 5:
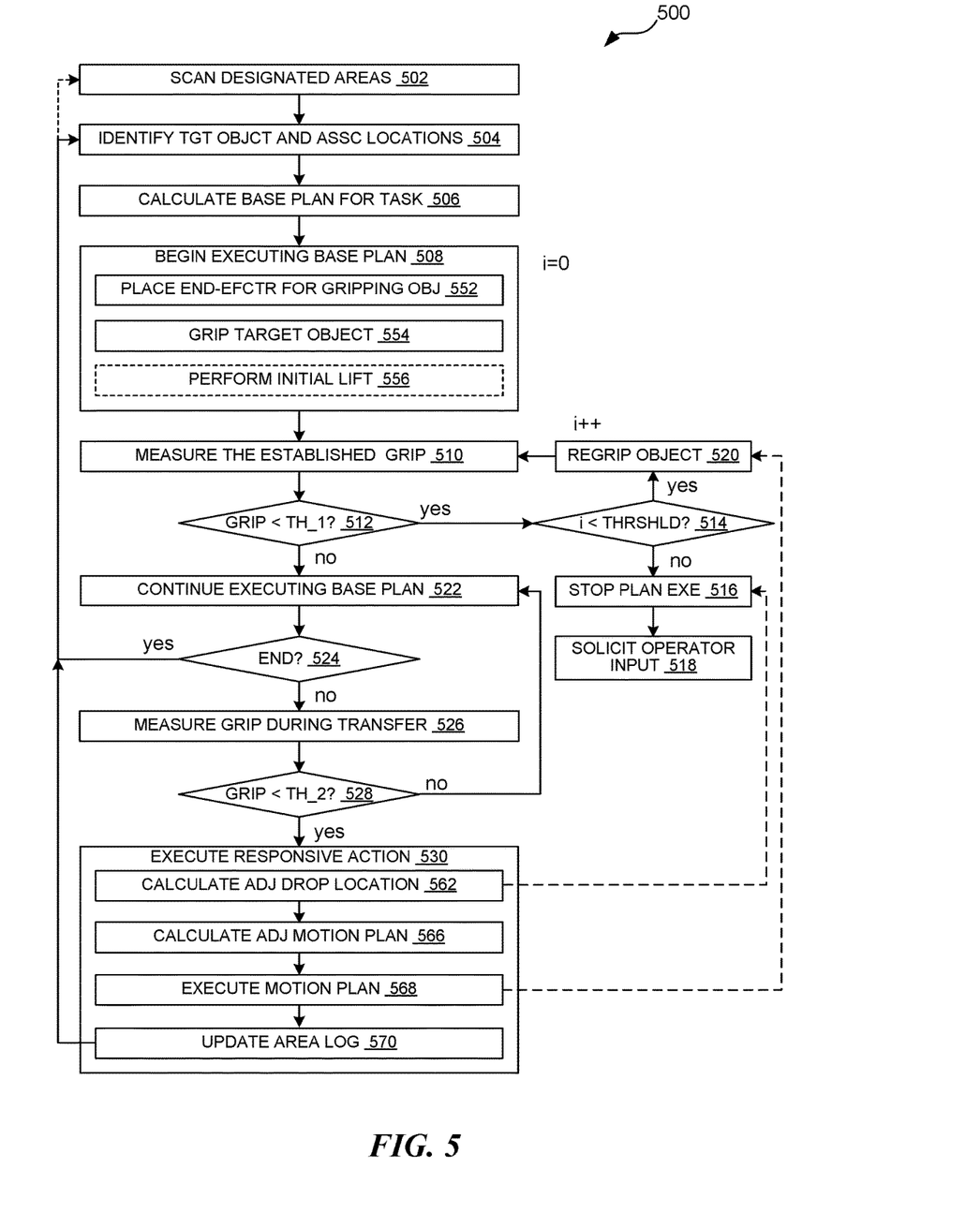
FIG. 5 is a flow diagram for operating the robotic system of FIG. 1 in accordance with one or more embodiments of the present technology.

FIG. 5 is a flow diagram for a method 500 of operating the robotic system 100 of FIG. 1 in accordance with one or more embodiments of the present technology. The method 500 can be for implementing granular control/manipulation of the target object 112 of FIG. 1 according to the contact measure 312 of FIG. 3A/FIG. 3B. In other words, the method 500 allows the robotic system 100 to follow and/or deviate from (e.g., perform other actions in addition to and/or instead of) the base motion plan 422 of FIG. 4 according to the contact measure 312. The method 500 can be implemented based on executing the instructions stored on one or more of the storage devices 204 of FIG. 2 with one or more of the processors 202 of FIG. 2.

At block 502, the robotic system 100 can scan designated areas. In some embodiments, the robotic system 100 can use (via, e.g., commands/prompts sent by the processors 202) one or more of the imaging devices 222 of FIG. 2 (e.g., the source scanner 412 of FIG. 4 and/or other area scanners) to generate imaging results (e.g., captured digital images and/or point clouds) of one or more designated areas, such as the pickup area and/or the drop area (e.g., the source drop area 432 of FIG. 4, the destination drop area 434 of FIG. 4, and/or the transit drop area 436 of FIG. 4).

At block 504, the robotic system 100 can identify the target object 112 of FIG. 1 and associated locations (e.g., the start location 114 of FIG. 1 and/or the task location 116 of FIG. 1). In some embodiments, for example, the robotic system 100 (via, e.g., the processors 202) can analyze the imaging results according to a pattern recognition mechanism and/or a set of rules to identify object outlines (e.g., perimeter edges or surfaces). The robotic system 100 can further identify groupings of object outlines (e.g., according to predetermined rules and/or pose templates) as corresponding to each unique instance of objects. For example, the robotic system 100 can identify the groupings of the object outlines that correspond to a pattern (e.g., same values or varying at a known rate/pattern) in color, brightness, depth/location, or a combination thereof across the object lines. Also, for example, the robotic system 100 can identify the groupings of the object outlines according to predetermined shape/pose templates defined in the master data.

From the recognized objects in the pickup location, the robotic system 100 can select (e.g., according to a predetermined sequence or set of rules and/or templates of object outlines) one as the target object 112. For example, the robotic system 100 can select the target object 112 as the object located on top, such as according to the point cloud representing the distances/positions relative to a known location of the source scanner 412). Also, for example, the robotic system 100 can select the target object 112 as the object located at a corner/edge and have two or more surfaces that are exposed/shown in the imaging results. Further, the robotic system 100 can select the target object 112 according to a predetermined pattern (e.g., left to right, nearest to furthest, etc. relative to a reference location).

For the selected target object 112, the robotic system 100 can further process the imaging result to determine the start location 114 and/or an initial pose. For example, the robotic system 100 can determine the initial pose of the target object 112 based on selecting from multiple predetermined pose templates (e.g., different potential arrangements of the object outlines according to corresponding orientations of the object) the one that corresponds to a lowest difference measure when compared to the grouping of the object outlines. Also, the robotic system 100 can determine the start location 114 by translating a location (e.g., a predetermined reference point for the determined pose) of the target object 112 in the imaging result to a location in the grid used by the robotic system 100. The robotic system 100 can translate the locations according to a predetermined calibration map.

In some embodiments, the robotic system 100 can process the imaging results of the drop areas to determine open spaces between objects. The robotic system 100 can determine the open spaces based on mapping the object lines according to a predetermined calibration map that translates image locations to real-world locations and/or coordinates used by the system. The robotic system 100 can determine the open spaces as the space between the object lines (and thereby object surfaces) belonging to different groupings/objects. In some embodiments, the robotic system 100 can determine the open spaces suitable for the target object 112 based on measuring one or more dimensions of the open spaces and comparing the measured dimensions to one or more dimensions of the target object 112 (e.g., as stored in the master data). The robotic system 100 can select one of the suitable/open spaces as the task location 116 according to a predetermined pattern (e.g., left to right, nearest to furthest, bottom to top, etc. relative to a reference location).

In some embodiments, the robotic system 100 can determine the task location 116 without or in addition to processing the imaging results. For example, the robotic system 100 can place the objects at the placement area according to a predetermined sequence of actions and locations without imaging the area. Also, for example, the robotic system 100 can process the imaging result for performing multiple tasks (e.g., transferring multiple objects, such as for objects located on a common layer/tier of a stack).

At block 506, the robotic system 100 can calculate a base plan (e.g., the base motion plan 422 of FIG. 4) for executing the task 402 of FIG. 4 for the target object 112. For example, the robotic system 100 can calculate the base motion plan 422 based on calculating a sequence of commands or settings, or a combination thereof, for the actuation devices 212 of FIG. 2 that will operate the robotic arm 304 of FIG. 3A/FIG. 3B and/or the end-effector (e.g., the gripper 302 of FIG. 3A and/or the gripper 352 of FIG. 3B). For some tasks, the robotic system 100 can calculate the sequence and the setting values that will manipulate the robotic arm 304 and/or the end-effector to transfer the target object 112 from the start location 114 to the task location 116. The robotic system 100 can implement a motion planning mechanism (e.g., a process, a function, an equation, an algorithm, a computer-generated/readable model, or a combination thereof) configured to calculate a path in space according to one or more constraints, goals, and/or rules. For example, the robotic system 100 can use A* algorithm, D* algorithm, and/or other grid-based searches to calculate the path through space for moving the target object 112 from the start location 114 to the task location 116. The motion planning mechanism can use a further process, function, or equation, and/or a translation table, to convert the path into the sequence of commands or settings, or combination thereof, for the actuation devices 212. In using the motion planning mechanism, the robotic system 100 can calculate the sequence that will operate the robotic arm 304 and/or the end-effector and cause the target object 112 to follow the calculated path.

At block 508, the robotic system 100 can begin executing the base plan. The robotic system 100 can begin executing the base motion plan 422 based on operating the actuation devices 212 according to the sequence of commands or settings or combination thereof. The robotic system 100 can execute a first set of actions in the base motion plan 422. For example, the robotic system 100 can operate the actuation devices 212 to place the end-effector at a calculated location and/or orientation about the start location 114 for gripping the target object 112 as illustrated in block 552. At block 554, the robotic system 100 can operate the actuation devices 212 to have the end-effector (e.g., the gripper 302 and/or the gripper 352) engage and grip the target object 112. In some embodiments, as illustrated at block 556, the robotic system 100 can perform an initial lift by moving the end-effector up by a predetermined distance. In some embodiments, the robotic system 100 can reset or initialize an iteration counter 'i' used to track a number of gripping actions.

At block 510, the robotic system 100 can measure the established grip. The robotic system 100 can measure the established grip based on determining the contact measure 312 of FIG. 3A/FIG. 3B using one or more of the contact sensors 226 of FIG. 2. The robotic system 100 can determine the contact measure 312 while executing the base motion plan 422, such as after gripping the target object 112 (block 554) and/or after performing the initial lift (block 556). The robotic system 100 can determine the contact measure 312 by using one or more of the contact sensors 226 to measure a force, a torque, a pressure, or a combination thereof at one or more locations on the robotic arm 304, one or more locations on the end-effector, or a combination thereof. In some embodiments, such as for the grip established by the gripper 302 (e.g., a suction gripper, including the suction cups 306 of FIG. 3A), the contact measure 312 can correspond to a quantity, a location, or a combination thereof of the suction cups 306 contacting a surface of the target object 112 and holding a vacuum condition therein. In some embodiments, such as for the grip established by the gripper 352 (e.g., an impactive gripper, including the gripper jaws 356 of FIG. 3B), the contact measure 312 can correspond to a shift in the target object 112 relative to the gripper jaws 356.

At decision block 512, the robotic system 100 can compare the measured grip to a threshold (e.g., an initial grip threshold). For example, the robotic system 100 can compare the contact measure 312 to a predetermined threshold. In other words, the robotic system 100 can determine whether the contact/grip is sufficient to continue manipulating (e.g., lifting, transferring, and/or reorienting) the target object 112.

When the measured grip fails to satisfy the threshold, the robotic system 100 can evaluate whether the iteration count for regripping the target object 112 has reached an iteration threshold, as illustrated at decision block 514. While the iteration count is less than the iteration threshold, the robotic system 100 can deviate from the base motion plan 422 when the contact measure 312 fails to satisfy (e.g., is below) the threshold. Accordingly, at block 520, the robotic system 100 can operate the robotic arm 304 and/or the end-effector to execute a regripping action not included in the base motion plan 422. For example, the regripping action can include a predetermined sequence of commands or settings, or a combination thereof, for the actuation devices 212 that will cause the robotic arm 304 to lower the end-effector (e.g., in reversing the initial lift) and/or cause the end-effector to release the target object 112 and regrip the target object 112. In some embodiments, the predetermined sequence can further operate the robotic arm 304 to adjust a position of the gripper after releasing the target object and before regripping it. In performing the regripping action, the robotic system 100 can pause execution of the base motion plan 422. After executing the regripping action, the robotic system 100 can increment the iteration count.

After regripping the object, the robotic system 100 can measure the established grip as described above for block 510 and evaluate the established grip as described above for block 512. The robotic system 100 can attempt to regrip the target object 112 as described above until the iteration count reaches the iteration threshold. When the iteration count reaches the iteration threshold, the robotic system 100 can stop executing the base motion plan 422, as illustrated at block 516. In some embodiments, the robotic system 100 can solicit operator input, as illustrated at block 518. For example, the robotic system 100 can generate an operator notifier (e.g., a predetermined message) via the communication devices 206 of FIG. 2 and/or the input-output devices 208 of FIG. 2. The robotic system 100 can process the task 402 and/or the base motion plan 422 according to the operator input. In some embodiments, the robotic system 100 can cancel or delete the base motion plan 422, record a predetermined status (e.g., an error code) for the corresponding task 402, or perform a combination thereof. In some embodiments, the robotic system 100 can reinitiate the process by imaging the pickup/task areas (block 502) and/or identifying another item in the pickup area as the target object (block 504) as described above.

When the measured grip satisfies the threshold, the robotic system 100 can continue executing remaining portions/actions of the base motion plan 422, as illustrated at block 522. Similarly, when the contact measure 312 satisfies the threshold after regripping the target object 112, the robotic system 100 can resume execution of the paused base motion plan 422. Accordingly, the robotic system 100 can continue executing the sequenced actions (i.e., following the grip and/or the initial lift) in the base motion plan 422 by operating the actuation devices 212 and/or the transport motor 214 of FIG. 2 according to the remaining sequence of commands and/or settings. For example, the robotic system 100 can transfer (e.g., vertically and/or horizontally) and/or reorient the target object 112 according to the base motion plan 422.

While executing the base motion plan 422, the robotic system 100 can track the current location 424 and/or the current orientation of the target object 112. The robotic system 100 can track the current location 424 according to outputs from the position sensors 224 of FIG. 2 to locate one or more portions of the robotic arm 304 and/or the end-effector. In some embodiments, the robotic system 100 can track the current location 424 by processing the outputs of the position sensors 224 with a computer-generated model, a process, an equation, a position map, or a combination thereof. Accordingly, the robotic system 100 can combine the positions or orientations of the joints and the structural members and further map the positions to the grid to calculate and track the current location 424. In some embodiments, the base motion plan 422 can use a multilaterating system. For example, the robotic system 100 can include multiple beacon sources. The robotic system 100 can measure the beacon signals at one or more locations in the robotic arm 304 and/or the end-effector and calculate separation distances between the signal sources and the measured location using the measurements (e.g., signal strength, time stamp or propagation delay, and/or phase shift). The robotic system 100 can map the separation distances to known locations of the signal sources and calculate the current location of the signal-receiving location as the location where the mapped separation distances overlap.

At decision block 524, the robotic system 100 can determine whether the base plan has been fully executed to the end. For example, the robotic system 100 can determine whether all of the actions (e.g., the commands and/or the settings) in the base motion plan 422 have been completed. Also, the robotic system 100 can determine that the base motion plan 422 is finished when the current location 424 matches the task location 116. When the robotic system 100 has finished executing the base plan, the robotic system 100 can reinitiate the process by imaging the pickup/task areas (block 502) and/or identifying another item in the pickup area as the target object (block 504) as described above.

Otherwise, at block 526, the robotic system 100 can measure the grip (i.e., by determining the contact measure 312) during transfer of the target object 112. In other words, the robotic system 100 can determine the contact measure 312 while executing the base motion plan 422. In some embodiments, the robotic system 100 can determine the contact measure 312 according to a sampling frequency or at predetermined times. In some embodiments, the robotic system 100 can determine the contact measure 312 before and/or after executing a predetermined number of commands or settings with the actuation devices 212. For example, the robotic system 100 can sample the contact sensors 226 after or during a specific category of maneuvers, such as for lifts or rotations. Also, for example, the robotic system 100 can sample the contact sensors 226 when a direction and/or a magnitude of an accelerometer output matches or exceeds a predetermined threshold that represents a sudden or fast movement. The robotic system 100 can determine the contact measure 312 using one or more processes described above (e.g., for block 510).

In some embodiments, the robotic system 100 can determine the orientation of the gripper and/or the target object 112 and adjust the contact measure accordingly. The robotic system 100 can adjust the contact measure based on the orientation to account for a directional relationship between a sensing direction for the contact sensor and gravitational force applied to the target object according to the orientation. For example, the robotic system 100 can calculate an angle between the sensing direction and a reference direction (e.g., "down" or the direction of the gravitational force) according to the orientation. The robotic system 100 can scale or multiply the contact measure according to a factor and/or a sign that corresponds to the calculated angle.

At decision block 528, the robotic system 100 can compare the measured grip to a threshold (e.g., a transfer grip threshold). In some embodiments, the transfer grip threshold can be less than or equal to the initial grip threshold associated with evaluating an initial (e.g., before transferring) grip on the target object 112. Accordingly, the robotic system 100 can enforce a stricter rule for evaluating the grip before initiating transfer of the target object 112. The threshold requirement for the grip can be higher initially since contact sufficient for picking up the target object 112 is likely to be sufficient for transferring the target object 112.

When the measured grip satisfies (e.g., is not less than) the threshold, the robotic system 100 can continue executing the base plan as illustrated at block 522 and described above. When the measured grip fails to satisfy (e.g., is less than) the threshold, the robotic system 100 can deviate from the base motion plan 422 and execute one or more responsive actions as illustrated at block 530. Accordingly, when the measured grip is insufficient in light of the threshold, the robotic system 100 can operate the robotic arm 304, the end-effector, or a combination thereof according to commands and/or settings not included in the base motion plan 422. In some embodiments, the robotic system 100 can execute different commands and/or settings based on the current location 424.

For illustrative purposes, the response actions will be described using a controlled drop. However, it is understood that the robotic system 100 can execute other actions, such as by stopping execution of the base motion plan 422 as illustrated at block 516 and/or by soliciting operator input as illustrated at block 518.

The controlled drop includes one or more actions for placing the target object 112 in one of the drop areas (e.g., instead of the task location 116) in a controlled manner (i.e., based on lowering and/or releasing the target object 112 and not as a result of a complete grip failure). In executing the controlled drop, the robotic system 100 can dynamically (i.e., in real time and/or while executing the base motion plan 422) calculate different locations, maneuvers or paths, and/or actuation device commands or settings according to the current location 424.

At block 562, the robotic system 100 can calculate the adjusted drop location 442 of FIG. 4 and/or an associated pose for placing the target object 112. In calculating the adjusted drop location 442, the robotic system 100 can identify the drop area (e.g., the source drop area 432 of FIG. 4, the destination drop area 434 of FIG. 4, or the transit drop area 436 of FIG. 4) nearest to and/or ahead (e.g., between the current location 424 and the task location 116) of the current location 424. The robotic system 100 can identify the suitable drop area based on comparing the current location 424 to boundaries that define the drop areas. In some embodiments, when the current location 424 is within one of the drop areas (e.g., such as when the target object 112 is still above the source pallet/bin or the target pallet/bin), the robotic system 100 can calculate the adjusted drop location 442 as the current location 424. In some embodiments, when the current location 424 is within one of the drop areas, the robotic system 100 can calculate the adjusted drop location 442 based on adding a predetermined offset distance and/or direction to the current location 424, such as for placing the target object 112 away from a commonly used corridor.

Also, when the current location 424 is between (i.e., not within) the drop areas, the robotic system 100 can calculate distances to the drop areas (e.g., distances to representative reference locations for the drop areas). Accordingly, the robotic system 100 can identify the drop area that is nearest to the current location 424 and/or ahead of the current location 424. Based on the identified drop area, the robotic system 100 can calculate a location therein as the adjusted drop location 442. In some embodiments, the robotic system 100 can calculate the adjusted drop location 442 based on selecting a location according to a predetermined order (e.g., left to right, bottom to top, and/or front to back relative to a reference location).

In some embodiments, the robotic system 100 can calculate distances from the current location 424 to open spaces (e.g., as identified in block 504 and/or tracked according to ongoing placements of objects) within the drop areas. The robotic system 100 can select the open space that is ahead of the current location 424 and/or nearest to the current location 424 as the adjusted drop location 442.

In some embodiments, prior to selecting the drop area and/or the open space, the robotic system 100 can use a predetermined process and/or equation to translate the contact measure 312 to a maximum transfer distance. For example, the predetermined process and/or equation can estimate based on various values of the contact measure 312 a corresponding maximum transfer distance and/or a duration before a complete grip failure. Accordingly, the robotic system 100 can filter out the available drop areas and/or the open spaces that are farther than the maximum transfer distance from the current location 424. In some embodiments, when the robotic system 100 fails to identify available drop areas and/or open spaces (e.g., when the accessible drop areas are full), the robotic system 100 can stop executing the base motion plan 422, as illustrated at block 516, and/or solicit operator input, as illustrated at block 518.

At block 566, the robotic system 100 can calculate the adjusted motion plan 444 for transferring the target object 112 from the current location 424 to the adjusted drop location 442. The robotic system 100 can calculate the adjusted motion plan 444 in a way similar to that described above for block 506. For example, the robotic system 100 can use A* or D* to calculate a path from the current location 424 to the adjusted drop location 442 and convert the path into a sequence of commands or settings, or a combination thereof, for the actuation devices 212 that will operate the robotic arm 304 and/or the end-effector to maneuver the target object 112 to follow the path.

At block 568, the robotic system 100 can execute the adjusted motion plan 444 in addition to and/or instead of the base motion plan 422. For example, the robotic system 100 can operate the actuation devices 212 according to the sequence of commands or settings or combination thereof, thereby maneuvering the robotic arm 304 and/or the end-effector to cause the target object 112 to move according to the path.

In some embodiments, the robotic system 100 can pause execution of the base motion plan 422 and execute the adjusted motion plan 444. Once the target object 112 is placed at the adjusted drop location 442 based on executing the adjusted motion plan 444 (i.e., completing execution of the controlled drop), in some embodiments, the robotic system 100 can attempt to regrip the target object 112 as described above for block 520 and then measure the established grip as described above for block 510. In some embodiments, the robotic system 100 can attempt to regrip the target object 112 up to an iteration limit as described above. If the contact measure 312 satisfies the initial grip threshold, the robotic system 100 can reverse the adjusted motion plan 444 (e.g., return to the paused point/location) and continue executing the remaining portions of the paused base motion plan 422. In some embodiments, the robotic system 100 can update and recalculate the adjusted motion plan 444 from the current location 424 (after regripping) to the task location 116 and execute the adjusted motion plan 444 to finish executing the task 402.

In some embodiments, at block 570 the robotic system 100 can update an area log (e.g., a record of open spaces and/or placed objects) for the accessed drop area to reflect the placed target object 112. For example, the robotic system 100 can regenerate the imaging results for the corresponding drop area. In some embodiments, the robotic system 100 can cancel the remaining actions of the base motion plan 422 after executing the controlled drop and placing the target object 112 at the adjusted drop location 442. In one or more embodiments, the transit drop area 436 can include a pallet or a bin placed on top of one of the transport units 106 of FIG. 1. At a designated time (e.g., when the pallet/bin is full and/or when the incoming pallet/bin is delayed), the corresponding transport unit can go from the drop area to the pickup area. Accordingly, the robotic system 100 can reimplement the method 500, thereby reidentifying the dropped items as the target object 112 and transferring them to the corresponding task location 116.

Once the target object 112 has been placed at the adjusted drop location 442, the robotic system 100 can repeat the method 500 for a new target object. For example, the robotic system 100 can determine the next object in the pickup area as the target object 112, calculate a new base motion plan to transfer the new target object, etc.

In some embodiments, the robotic system 100 can include a feedback mechanism that updates the path calculating mechanism based on the contact measure 312. For example, as the robotic system 100 implements the actions to regrip the target object 112 with adjusted positions (e.g., as described above for block 520), the robotic system 100 can store the position of the end-effector that produced the contact measure 312 that satisfied the threshold (e.g., as described above for block 512). The robotic system 100 can store the position in association with the target object 112. The robotic system 100 can analyze the stored positions (e.g., using a running window for analyzing a recent set of actions) for gripping the target object 112 when the number of grip failures and/or successful regrip actions reach a threshold. When a predetermined number of regrip actions occur for a specific object, the robotic system 100 can update the motion planning mechanism to place the gripper at a new position (e.g., position corresponding to the highest number of successes) relative to the target object 112.

Based on the operations represented in block 510 and/or block 526 the robotic system 100 (via, e.g., the processors 202) can track a progress of executing the base motion plan 422. In some embodiments, the robotic system 100 can track the progress according to horizontal transfer of the target object 112. For example, as illustrated in FIG. 5, the robotic system 100 can track the progress based on measuring the established grip (block 510) before initiating the horizontal transfer and based on measuring the grip during transfer (block 526) after initiating the horizontal transfer. Accordingly, the robotic system 100 can selectively generate a new set (i.e., different from the base motion plan 422) of actuator commands, actuator settings, or a combination thereof based on the progress as described above.

In other embodiments, for example, the robotic system 100 can track the progress based on tracking the commands, the settings, or a combination thereof that has been communicated to and/or implemented by the actuation devices 212. Based on the progress, the robotic system 100 can selectively generate the new set of actuator commands, actuator settings, or a combination thereof to execute the regrip response action and/or the controlled drop response action. For example, when the progress is before any horizontal transfer of the target object 112, the robotic system 100 can select the initial grip threshold and execute the operations represented in blocks 512 (via, e.g., function calls or jump instructions) and onward. Also, when the progress is after the horizontal transfer of the target object 112, the robotic system 100 can select the transfer grip threshold and execute the operations represented in blocks 528 (via, e.g., function calls or jump instructions) and onward.

Implementing granular control/manipulation of the target object 112 (i.e., choosing to implement the base motion plan 422 or deviate from it) according to the contact measure 312 provides improved efficiency, speed, and accuracy for transferring the objects. For example, regripping the target object 112 when the contact measure 312 is below the initial grip threshold decreases the likelihood of grip failure occurring during transfer, which decreases the number of objects lost or unintentionally dropped during transfer. Moreover, each lost object requires human interaction to correct the outcome (e.g., move the lost object out of the motion path for subsequent tasks, inspect the lost object for damages, and/or complete the task for the lost object). Thus, reducing the number of lost objects reduces the human effort necessary to implement the tasks and/or the overall operation.

Moreover, placing the target object 112 in designated areas when the contact measure 312 is below the transfer grip threshold reduces the number of untracked obstacles and damaged items. Based on calculating the adjusted drop location 442 and executing the controlled drop, the target object 112 can be placed at known locations. Accordingly, the number of lost objects that end up in random untracked locations is reduced, which further reduces the likelihood of a lost object ending up at a location that blocks or hinders execution of subsequent tasks. Moreover, the robotic system 100 can avoid frequently used path segments in calculating the adjusted drop location 442 as described above, thereby further reducing the impact of insufficient grips. Additionally, since the target object 112 is placed in a controlled manner instead of being dropped from a height with momentum, the target object 112 contacts the placement location with less force. As such, executing the controlled drop greatly reduces the damages caused by losing the objects.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for operating a transfer robot including a gripper for gripping a target object and a robotic arm for maneuvering the gripper, the method comprising:
    calculating a base motion plan, wherein the base motion plan includes a first set of actuator commands, actuator settings, or a combination thereof, that is configured to operate the robotic arm and the gripper to transfer the target object from a start location to a task location;
    tracking a current location of the target object while executing the base motion plan;
    receiving a contact measure while executing the base motion plan, wherein the contact measure represents an amount of grip of the gripper on the target object measured by a contact sensor after initiating horizontal transfer of the target object;
    determining that the contact measure fails to satisfy a transfer grip threshold; and
    calculating an adjusted motion plan that deviates from the base motion plan based on the determination, wherein the adjusted motion plan includes a second set of actuator commands, actuator settings, or a combination thereof corresponding to a controlled drop including:
        selecting a drop area based on the current location, wherein the drop area is selected from a source drop area, a destination drop area, a transit drop area, or a combination thereof,
        calculating an adjusted drop location in the selected drop area, wherein the adjusted drop location is calculated after the contact measure is determined to be below the transfer grip threshold, and
        calculating an adjusted motion plan to transfer the target object from the current location to the adjusted drop location, wherein the adjusted drop location is different from the task location.

2. The method of claim 1, further comprising:
    tracking an orientation of the gripper while executing the base motion plan; and
    adjusting the contact measure based on the orientation to account for a directional relationship between a sensing direction for the contact sensor and gravitational force applied to the target object according to the orientation.

3. The method of claim 1, wherein selecting the drop area includes:
    determining that the current location is outside of the source drop area and the destination drop area; and
    selecting the transit drop area based on the determination to intentionally place the target object therein instead of the task location.

4. The method of claim 1, wherein selecting the drop area includes
    determining that the current location is within the source drop area, wherein the source drop area is associated with boundaries of a container or a pallet including the start location; and
    selecting the source drop area based on the determination to intentionally place the target object therein.

5. The method of claim 1, wherein selecting the drop area includes:
    determining that the current location is within the destination drop area, wherein the destination drop area is associated with boundaries of a container or a pallet including the task location; and
    selecting the destination drop area based on the determination to intentionally place the target object therein.

6. The method of claim 1, wherein:
    the adjusted drop location is different from both the start location and the task location; and
    the adjusted motion plan includes actuator commands, actuator settings, or a combination thereof to:
        transfer the target object to the adjusted drop location from the current location, and
        release the target object from the gripper at the adjusted drop location to intentionally place the target object at the adjusted drop location.

7. The method of claim 1, wherein the adjusted motion plan includes actuator commands, actuator settings, or a combination thereof to regrip the target object with the gripper after executing the controlled drop.

8. The method of claim 1, further comprising:
    cancelling remaining actions of the base motion plan after executing the controlled drop;
    determining a new target object; and
    calculating a new base motion plan to transfer the new target object.

9. The method of claim 1, wherein the transfer grip threshold is lesser than an initial grip threshold associated with initially gripping the target object before horizontally transferring the target object.

10. The method of claim 1, wherein receiving the contact measure includes receiving a measurement of a force, a torque, a pressure, or a combination thereof that corresponds to the amount of grip, and wherein the measurements are made for one or more locations on the robotic arm, one or more locations on the gripper, or a combination thereof.

11. A method for operating a transfer robot including a gripper for gripping a target object and a robotic arm for maneuvering the gripper, the method comprising:
    calculating a base motion plan, wherein the base motion plan includes a sequence of actuator commands, actuator settings, or a combination thereof, that is configured to operate the robotic arm and the gripper to transfer the target object from a start location to a task location;
    receiving a contact measure while executing the base motion plan, wherein the contact measure represents an amount of grip of the gripper on the target object measured by a contact sensor after gripping the target object and before initiating horizontal transfer of the target object;
    determining that the contact measure fails to satisfy an initial grip threshold;
    generating regrip commands, regrip settings, or a combination thereof based on the determination, wherein the generated regrip commands, regrip settings, or a combination thereof deviate from the base motion plan to regrip the target object.

12. The method of claim 11, further comprising:
    executing a first set of actions in the base motion plan, including placing the gripper about the start location and initially gripping the target object with the gripper;
    wherein:
    receiving the contact measure includes receiving the contact measure determined after initially gripping the target object; and
    the generated actuator commands, actuator settings, or a combination thereof are configured to operate the robotic arm, the gripper, or a combination thereof to:
        release the target object from the gripper when the contact measure is below the initial grip threshold after executing the first set of actions, and regrip the target object with the gripper after releasing the target object.

13. The method of claim 12, further comprising generating position adjustment commands, position adjustment settings, or a combination thereof to adjust a position of the gripper after releasing the target object and before regripping the target object.

14. The method of claim 13, further comprising:
receiving a regrip contact measure after regripping the target object;
determining that the regrip contact measure satisfies the initial grip threshold; and
adjusting the base motion plan based on the determination, wherein the base motion plan is adjusted according to the generated position adjustment commands, position adjustment settings, or a combination thereof to transfer the target object from the adjusted position of the gripper to the task location.

15. The method of claim 11, further comprising:
pausing execution of the base motion plan when the contact measure fails to satisfy the initial grip threshold; and
receiving a regrip contact measure after regripping the target object; and
resuming execution of the base motion plan when the regrip contact measure satisfies the initial grip threshold.

16. The method of claim 11, further comprising:
pausing execution of the base motion plan when the contact measure fails to satisfy the initial grip threshold;
determining that an iteration count exceeds a threshold based on iteratively:
incrementing the iteration count after regripping the target object,
receiving a regrip contact measure after regripping the target object,
determining that the regrip contact measure fails to satisfy an initial grip threshold, and
regenerating the regrip commands, regrip settings, or a combination to regrip the target object; and
generating a solicitation for an operator input when the iteration count exceeds the threshold.

17. The method of claim 11, wherein the contact measure represents a quantity, a location, or a combination thereof of suction cups of the gripper contacting a surface of the target object and holding a vacuum condition therein.

18. The method of claim 11, wherein the contact measure corresponds to a shift in the target object relative to jaws of the gripper that are configured to apply compressing forces on opposing points of the target object.

19. A tangible, non-transient computer-readable medium having processor instructions stored thereon that, when executed by a robotic system via one or more processors thereof, cause the robotic system to:
calculate a base motion plan, wherein the base motion plan includes a first set of actuator commands, actuator settings, or a combination thereof, that is configured to operate a robotic arm and a gripper to transfer a target object from a start location to a task location;
receive a contact measure while executing the base motion plan, wherein the contact measure represents an amount of grip of the gripper on the target object measured by a contact sensor;
determine that the contact measure fails to satisfy a threshold;
track a progress of executing the base motion plan, wherein the progress is associated with a horizontal transfer of the target object; and
selectively generate a second set of actuator commands, actuator settings, or a combination thereof based on the determination and the progress for operating the robotic arm, the gripper, or a combination thereof to deviate from the base motion plan and execute one or more response actions not included in the base motion plan.

20. The tangible, non-transient computer-readable medium of claim 19 further comprising:
instructions to track a current location of the target object while executing the base motion plan; and
instructions to determine that the progress corresponds to execution of the horizontal transfer;
wherein instructions to selectively generate includes:
instructions to generate the second set according to the current location based on the progress determination, wherein the second set corresponds to a controlled drop for intentionally placing the target object at a location different from the task location.

* * * * *